(12) United States Patent
Stevenson et al.

(10) Patent No.: US 7,334,645 B2
(45) Date of Patent: Feb. 26, 2008

(54) ARTICULATED POWER TRANSFER APPARATUS

(75) Inventors: Donald Stevenson, Raymore (CA); Miles Evans, Regina (CA)

(73) Assignee: Degelman Industries Ltd., Regina, Saskatchewan (CA)

( * ) Notice: Subject to any disclaimer, the term of this patent is extended or adjusted under 35 U.S.C. 154(b) by 0 days.

(21) Appl. No.: 10/841,737

(22) Filed: May 7, 2004

(65) Prior Publication Data

US 2004/0221558 A1    Nov. 11, 2004

(51) Int. Cl.
*A01B 59/00* (2006.01)

(52) U.S. Cl. ...................................... 172/677

(58) Field of Classification Search ................ 56/14.9; 172/47, 79, 677
See application file for complete search history.

(56) References Cited

U.S. PATENT DOCUMENTS

| | | | | |
|---|---|---|---|---|
| 2,974,470 A * | 3/1961 | Lucia et al. | ................. | 56/11.9 |
| 3,576,213 A * | 4/1971 | Hall | ............... | 172/44 |
| 4,187,664 A * | 2/1980 | Meek et al. | ................. | 56/13.6 |
| 4,366,877 A * | 1/1983 | Vissers et al. | ............. | 180/53.1 |
| 4,525,987 A * | 7/1985 | Werner et al. | ................ | 56/15.2 |
| 4,714,123 A * | 12/1987 | Ermacora et al. | .......... | 180/14.4 |
| 4,738,461 A * | 4/1988 | Stephenson et al. | ......... | 280/400 |
| 4,899,523 A * | 2/1990 | Frumholtz et al. | ............. | 56/155 |
| 4,979,359 A * | 12/1990 | Inskeep | ...................... | 56/14.9 |
| 5,060,462 A * | 10/1991 | Helfer et al. | ................. | 56/14.9 |
| 5,201,167 A * | 4/1993 | Rowse | ............................ | 56/6 |
| 5,725,230 A * | 3/1998 | Walkup | ...................... | 280/442 |
| 5,957,475 A | 9/1999 | Pearen et al. | ................ | 280/409 |
| 6,105,354 A * | 8/2000 | Luhn et al. | ................... | 56/385 |
| 6,179,315 B1 * | 1/2001 | Boriack | ...................... | 280/419 |
| 6,739,612 B2 * | 5/2004 | Colistro | ....................... | 280/475 |

OTHER PUBLICATIONS

"Pearen Handy-Hitch", Handy-Hitch Mfg, Box 66, Indian Head, SK S0G 2K0.
"Schulte, FL×15/FL×10 Flex Arm", Schulte Industries, Ltd., PO Box 70, Englefeld Saskatchewan, Canada, S0K 1N0.
"New Mower Conditioners, Rotary and Sicklebar Mower Conditioners", John Deere.

\* cited by examiner

*Primary Examiner*—Thomas B. Will
*Assistant Examiner*—Alicia Torres
(74) *Attorney, Agent, or Firm*—Davis Bujold & Daniels, P.L.L.C.

(57) ABSTRACT

A hitch apparatus for connection between a tractor and a trailing implement such as a cutter includes a hitch arm at one end of the apparatus extending forwardly and pivotal so as to extend either inwardly or outwardly thus offsetting the apparatus across the rear of the tractor. The apparatus includes the draw bar hitch at the rear spaced across from the hitch arm for attachment to the cutter so that the cutter is offset to one side of the tractor. Two gear boxes and a drive shaft provide connection from the PTO of the tractor to the drive input of the cutter. The offset hitch apparatus allows the cutter to run in a ditch while the tractor remains on level ground.

23 Claims, 6 Drawing Sheets

ARTICULATED POWER TRANSFER APPARATUS

FIELD OF THE INVENTION

The present invention relates to an offset hitch apparatus which can be attached to a tractor for towing an implement, such as a cutter or mower behind the tractor with the implement being moveable by the hitch apparatus to be towed offset to either one side of the tractor or the other. The apparatus is particularly but not exclusively designed for use in towing a cutter behind a tractor so that the cutter can effect a cutting action in a ditch while the tractor remains on level ground.

BACKGROUND OF THE INVENTION

It is well known that various mowing attachments can be towed behind a tractor. In most cases the mowing attachment comprises a cutter defined by a plurality of rotary cutter elements connected together in a frame arrangement which may or may not provide pivotal action between each rotary element and the others. Normally the cutter is towed directly behind the tractor and this provides an effective cutting action on level ground where the cutter can be simply pulled centrally and directly behind the tractor.

However, it has been a long standing problem to provide effective cutting action in a ditch to one side of a roadway. In many cases the tractor driver simply drives the tractor in the ditch with the cutter towed behind to provide a cutting action directly behind the tractor.

In some cases, some degree of offset can be provided by moving the draw bar hitch of the tractor to one side since most tractors have the ability to allow the hitch to be moved to respective sides of the center position. However, this amount of offset is very limited and certainly does not allow the tractor to remain on level ground while the cutter is in the ditch.

Specially designed equipment has, therefore, been provided for this function including sickle bars which are carried to one side of the tractor and a ditch swather in which a swathing assembly is mounted at the outer end of a frame unit towed behind the tractor with the ditch swather being pivotal about a horizontal axis along the direction of movement so that it can run on level ground or can pivot downwardly into a ditch. Other apparatus have been used to fixedly maintain a cutter in an offset position relative to the tractor, and again while a certain variance in the offset angle may be permitted, these apparatus do not permit offset mowing on both sides of the tractor, or permit mowing or transport of the cutter directly behind the cutter. The power transmission through the offset angle in many known devices is provided by continuously variable transmission (CVT) joints in the power train. The drawback to CVT joints in the power train is the decrease in life span of the joint with an increase in required angle. Thus a large offset angle reduces the life span of the joint and severely limits the cutter operation hours. Additionally, these special devices are limited in application and relatively expensive.

OBJECT AND SUMMARY OF THE INVENTION

Wherefore, it is an object of the present invention to provide an improved apparatus which allows a conventional cutter to be used for mowing a ditch while a tractor remains on level ground.

Another object of the present invention is to provide an adjustable apparatus which permits a tractor operator to adjust an offset of the cutter relative to the tractor to facilitate the cutter mowing in a ditch while the tractor remains on level ground.

A still further object of the present invention is to provide an adjustable towing apparatus which permits an adjustable offset of the cutter relative to the tractor to either side of the cutter to facilitate the cutter mowing a ditch in any direction while the tractor remains on level ground.

Another object of the present invention is to provide an adjustable towing apparatus which permits the cutter to be towed directly, i.e. not offset in any manner, behind the tractor for both mowing and road transportation purposes.

According to one aspect of the invention, there is provided an off-set hitch apparatus for connection of an implement to a tractor comprising a moveable frame having a ground wheel or wheels for transportation across the ground, said frame and ground wheels being adjustable to a position relative to a towing device to define an intended direction of working movement; a moveable hitch arm attached to a forward end of the frame at one end of the frame and having a hitch coupling at a forward end of the arm for connecting the offset hitch apparatus to the draw bar hitch of the tractor; and a power input shaft for connecting to the power take-off of the tractor; a draw bar hitch at a rear end of the frame for connecting to a hitch coupling of an implement such that the implement is towed at a position offset to said one side form said draw bar hitch of the tractor; a power take-off drive shaft at the draw bar hitch of the frame for supplying drive power to the implement, and a series of gear boxes and drive shafts for communicating drive from the power input shaft to the power take-off shaft; and the frame being arranged to pivot relative to the direction of working movement of the tractor and the towed implement. The frame is further arranged to pivot about a substantially vertical axis at the forward end of the frame and a substantially vertical axis at the rear end of the frame respectively.

Preferably the frame comprises a parallel front and rear substantially vertically aligned beams supporting an intermediate longitudinal beam, the front beam being connected to the hitch arm and the second beam behind being connected to the draw bar hitch with the intermediate beam connecting the front and rear beams.

Preferably the ground wheels include at least a first wheel at the rear end of the frame opposite to the hitch arm which via hydraulics is moveable relative to the frame to direct the rotation of the intermediate and rear beam about the front beam axis.

Preferably the drive coupling includes a first gear box on the frame connected to the input shaft, a second gear box stacked substantially vertically above the first gear box on the frame and an intermediate drive shaft interconnecting the first and second gear boxes with a similarly stacked pair of gear boxes at the rear end of the frame.

The present invention also relates to a control arm for a towed cutting implement comprising a frame having a first pivotal connection at a first end and a second spaced apart pivotal connection at a second end, a steering wheel pivotally attached to the second end of the frame, a power train for operating the towed cutting implement comprising an input shaft at the first end of the frame and an output shaft at the second end of the frame defining a linear drive line therebetween, wherein the input and the output shafts are connected by a parallel intermediate power shaft spaced from the drive line.

BRIEF DESCRIPTION OF THE DRAWINGS

The invention will now be described, by way of example, with reference to the accompanying drawings in which.

In the drawings like characters of reference indicate corresponding parts in the different figures.

DETAILED DESCRIPTION OF THE INVENTION

Figure 1:
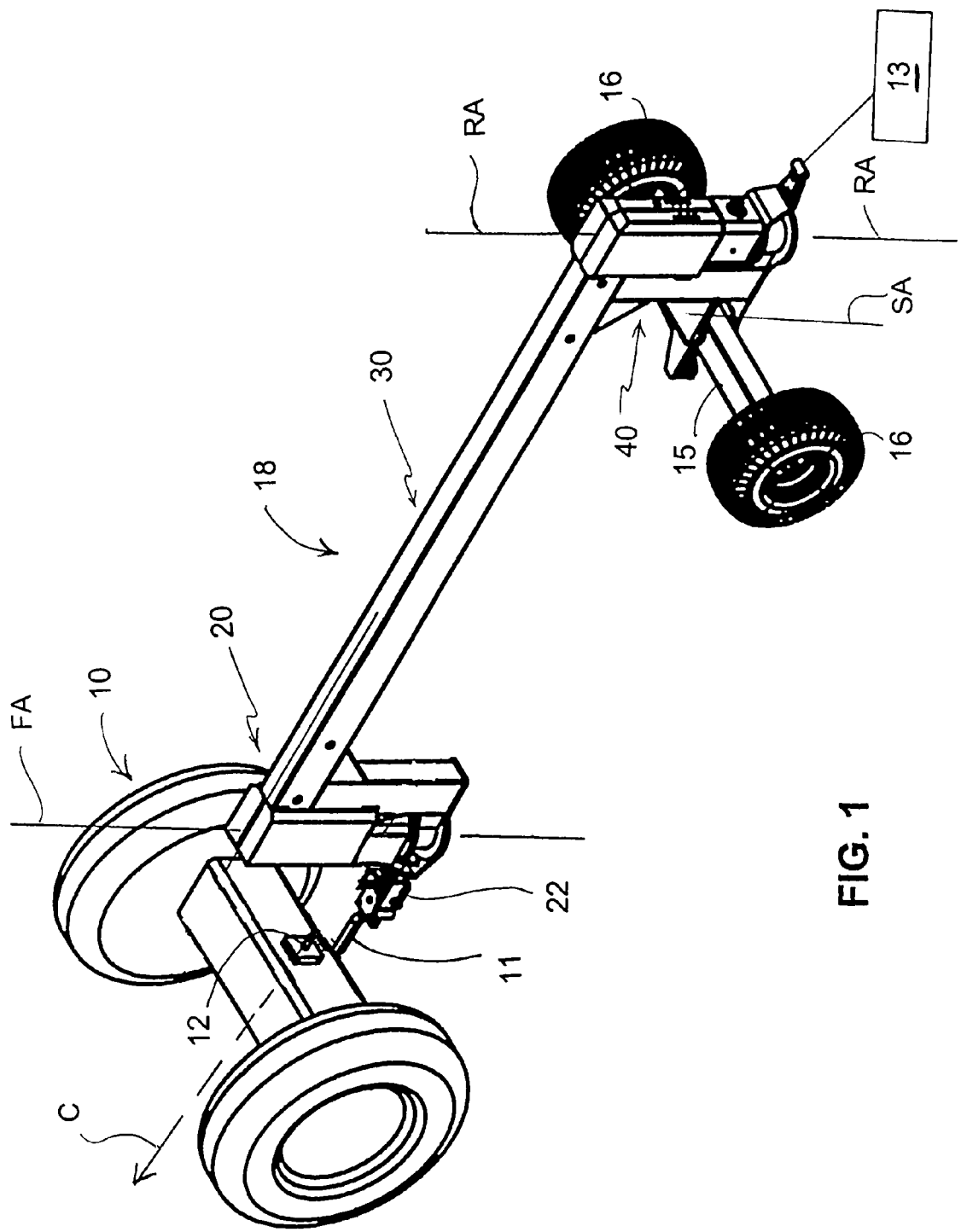
FIG. 1 is a perspective view of an articulated power transfer arm 18 according to the present invention for attachment between a tractor and a cutter showing the attachment of the apparatus to the rear of a tractor.
Figure 2:
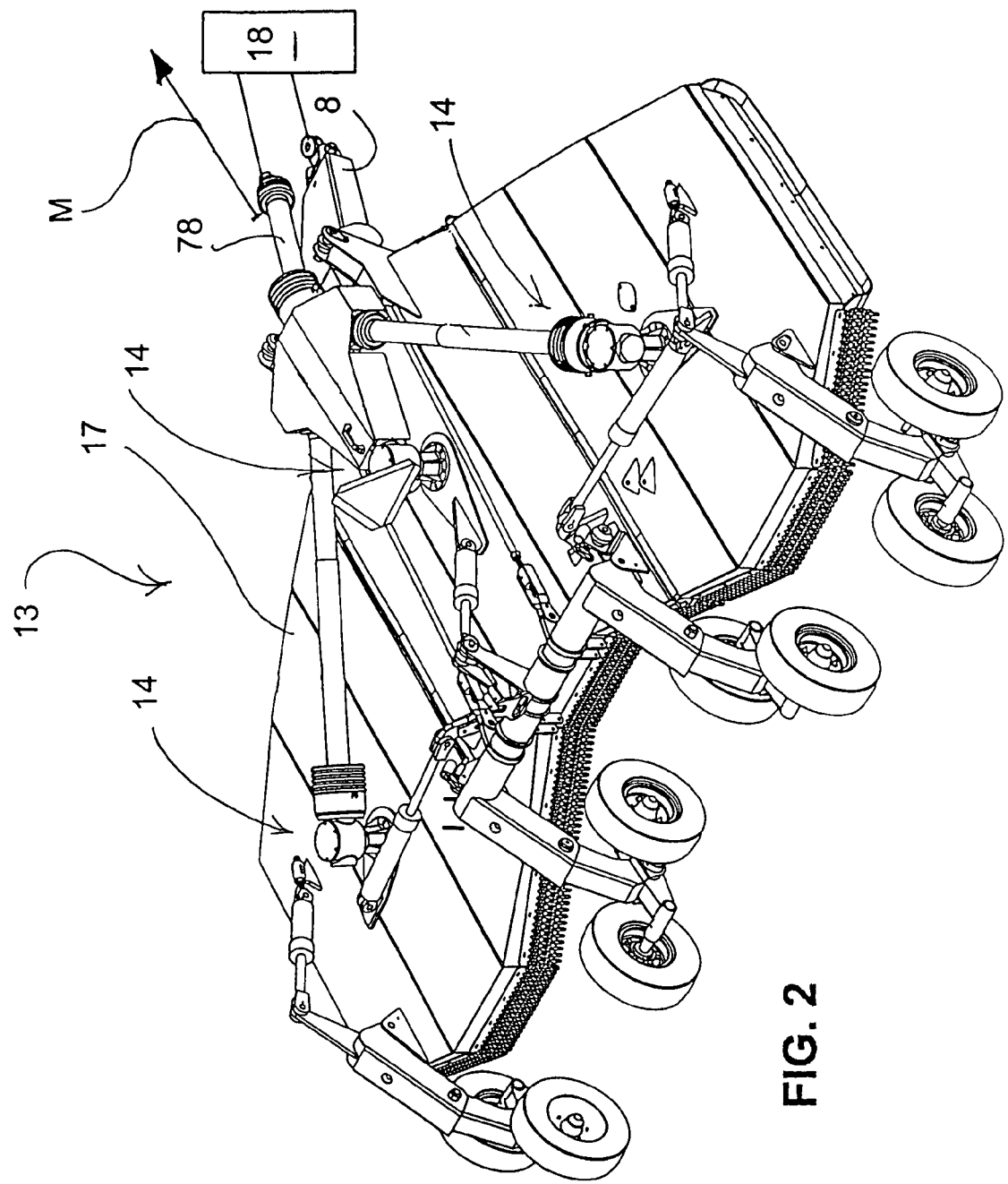
FIG. 2 is a perspective view of a cutter to be attached to the end of the power transfer arm 18 shown in FIG. 1.

In FIG. 1 a partial rear end of a conventional tractor 10 includes a draw bar 11, hitch 22 and a power take-off shaft 12 connected to an articulated power transfer 18. In order that a tractor 10 can tow a cutter 13 (as shown in greater detail FIG. 2), in a ditch while the tractor 10 remains on level ground, there is provided between the tractor 10 and the cutter 13 an articulated power transfer apparatus or power transfer arm 18.

The power transfer arm 18 is connected between the tractor draw bar 11 and hitch 22, and a hitch coupling 8 of the cutter 13. The articulated power transfer arm 18 generally comprises a front end 20 connected to the tractor 10, an intermediate portion 30 and a rear end 40 spaced from the tractor 10 and connected to the cutter 13. Besides connecting the tractor 10 and cutter 13, the arm 18 passes power supplied by the tractor 10 and the power take off shaft 12 through the arm 18 to the cutter 13 to rotate the cutting blades (not shown).

The power transfer arm 18 is provided, usually at the rear end 40 with at least a wheel or pair of ground wheels 16 to support and steer the power transfer arm 18 as it is towed along the ground behind, or behind and to the side of the tractor 10. It should be readily apparent to those of skill in the art that the ground wheels 16 are generally steered by a mechanically actuated steering system, for example a hydraulic pressure system not shown here, as such steering systems are well known in the art no further discussion is provided.

Figure 3:
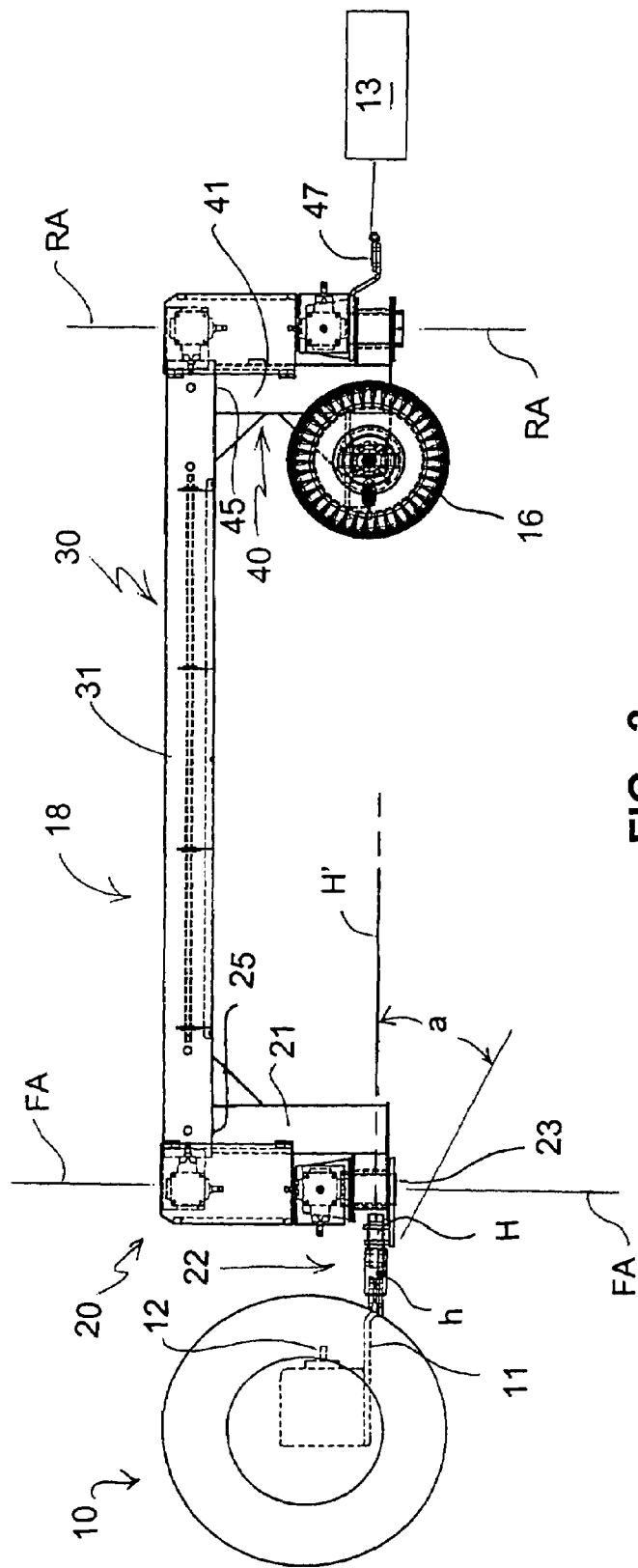
FIG. 3 is a side elevational view of the apparatus as shown in FIG. 1.
Figure 4:
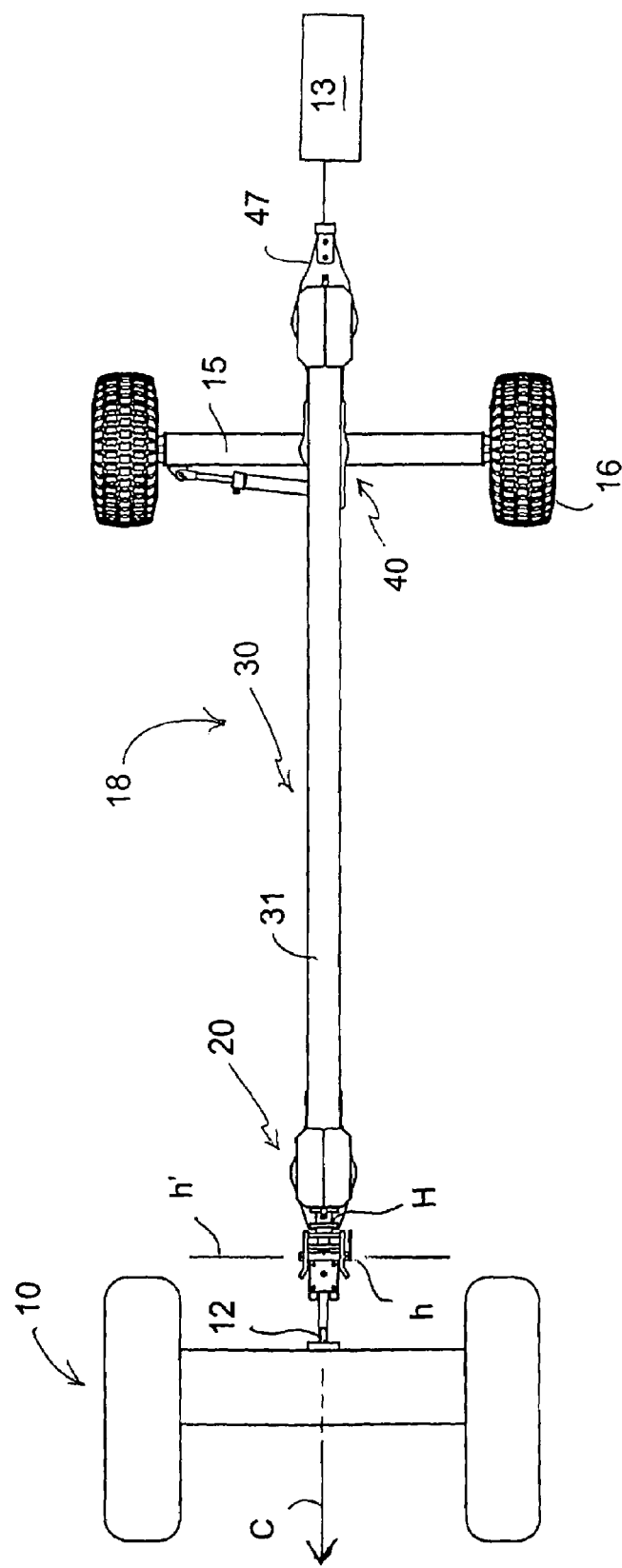
FIG. 4 is a top plan view of the apparatus of FIG. 1 showing the attachment of the apparatus to the rear of the tractor.

Turning to FIGS. 3 and 4, the arm is connected at its front end 20 to the draw bar 11 of the tractor 10 by a tractor hitch 22 which allows the power transfer arm 18 at least two degrees of freedom relative to the tractor 10. Travel hinge h of the hitch 22 permits axial displacement of the power transfer arm 18 relative to the tractor 10 about an axis h' generally perpendicular to the center line C of tractor 10 and positioned between the arm 18 and the tractor 10. The hinge h allows a certain amount of bending action, or relative up and down motion between the tractor 10 and the power transfer arm 18 to pass over hills, bumps or other ground obstacles. In other words, where there is a vertical height discrepancy between the arm ground wheels 16 and the rear wheels of the tractor 10, for example when the ground wheels 16 are down in a ditch, rotation of the arm 18 about the hinge h permits this relative height difference.

The hinge h thus defines a vertical displacement angle a for the power transfer arm 18, i.e. a non-parallel angle of the power transfer arm 18 relative to the tractor 10. This vertical displacement angle a is generally caused by the angle of the incline of the ditch being mowed relative to the surface upon which the tractor 10 is traveling. This displacement angle a is in a range of 0 to 50 degrees up, and 0 to 50 degrees down, however a more preferable range is 0 to 25 degrees up and, 0 to 25 degrees down to accommodate almost any ditch incline which tends to run in a range of about 5 to 15 degrees of slope.

Additionally, a second travel hinge H defines an axis of rotation H' substantially perpendicular to the axis h' and permits the power transfer arm 18 to rotate also about the axis of rotation H' i.e. radially relative to the tractor 10. This is important because, as can be ascertained by those of skill in the art, as the operator steers the ground wheels 16 down into a ditch beside, i.e. offset from the tractor 10, the ground wheels 16, which follow the contours of the side of the ditch, will not only lower the rear end 40 of the power transfer arm 18 relative to both the front end 20 of the arm and the tractor 10 running beside the ditch, but also radially rotates the power transfer arm 18 about the axis H' so that both ground wheels 16 can remain in contact with the ground.

The power transfer arm 18 itself is primarily composed of a front beam 21, an intermediate beam 31 and a rear beam 41 supporting and/or housing the drive arrangement for the cutter 13, including gear boxes and drive shafts to be discussed in further detail below. The front beam 21 includes a front swivel mount 23 supporting a portion of the tractor hitch 22, as discussed above, for connecting with the tractor draw bar 11. The swivel mount defines a front swing axis FA about which the intermediate beam 31 and the rear beam 41 (and any cutter 13 attached thereto) are permitted to swing left or right, i.e. horizontally towards or away from the centerline C of the tractor 10. As can be appreciated, as the ground wheels 16 steer the rear end 40 of the arm in a desired left or right direction relative to the centerline C of the tractor 10 as dictated by a tractor operator, the rear end 40 of the power transfer arm 18 swings about the front swing axis FA and correspondingly moves the towed cutter 13 to a desired horizontal, or offset relationship with respect to the centerline C of the tractor 10.

The three axes h', H' and FA all work in conjunction to allow the necessary articulation of the arm 18 relative to the tractor 10. Hinge h, and axis h' permits relative axial bending if necessary between the tractor 10 and the arm 18. Hinge H, and axis H' permits relative radial rotation between the tractor 10 and the arm 18, and the front swivel mount 23 and axis FA allows for the arm 18 to be offset to either side left or right of the centerline C of the tractor 10. This permits the stable offset ditch and incline mowing capability and articulation of the arm 18.

As seen in FIG. 3 the arm 18 itself is essentially an upside down, U-shaped structure having a front beam 21 which has an upper portion 25 substantially vertically spaced from the swivel mount 23 by a desired distance and connecting to the intermediate beam 31. The intermediate beam 31 extends at substantially a 90 degree angle from the front beam 21 a desired distance to connect again at substantially a 90 degree angle with an upper portion 45 of the rear beam 41. The rear beam 41 is supported by a steerable connection with the ground wheels 16 which permits the ground wheels 16 to pivot relative to the arm 18 and thus control the offset alignment of the arm 18 relative to the tractor 10.

The rear beam 41 also includes rear swivel mount 43 supporting a rear cutter draw bar 47 for attachment to the cutter hitch 8. The rear swivel mount 43 defines a rear swing axis RA about which the rear cutter draw bar 47, the rear output shaft 69 of the arm 18, the cutter hitch 8 and cutter 13 are all permitted to rotate, so that the cutter 13 will follow the power transfer arm 18, and remains in-line with the power take off shaft 12 as it is steered left or right by the ground wheels 16 relative to the centerline C of the tractor 10. Thus, despite this articulation of the arm 18 relative to the tractor 10, because of the rear swivel mount 43 the cutter 13 remains in-line with the output shaft 69 of the arm 18, this ensures direct transfer of power minimizing the wear of drive train 60 components, a further description of this feature of the present invention will be discussed in detail below.

Figure 5:
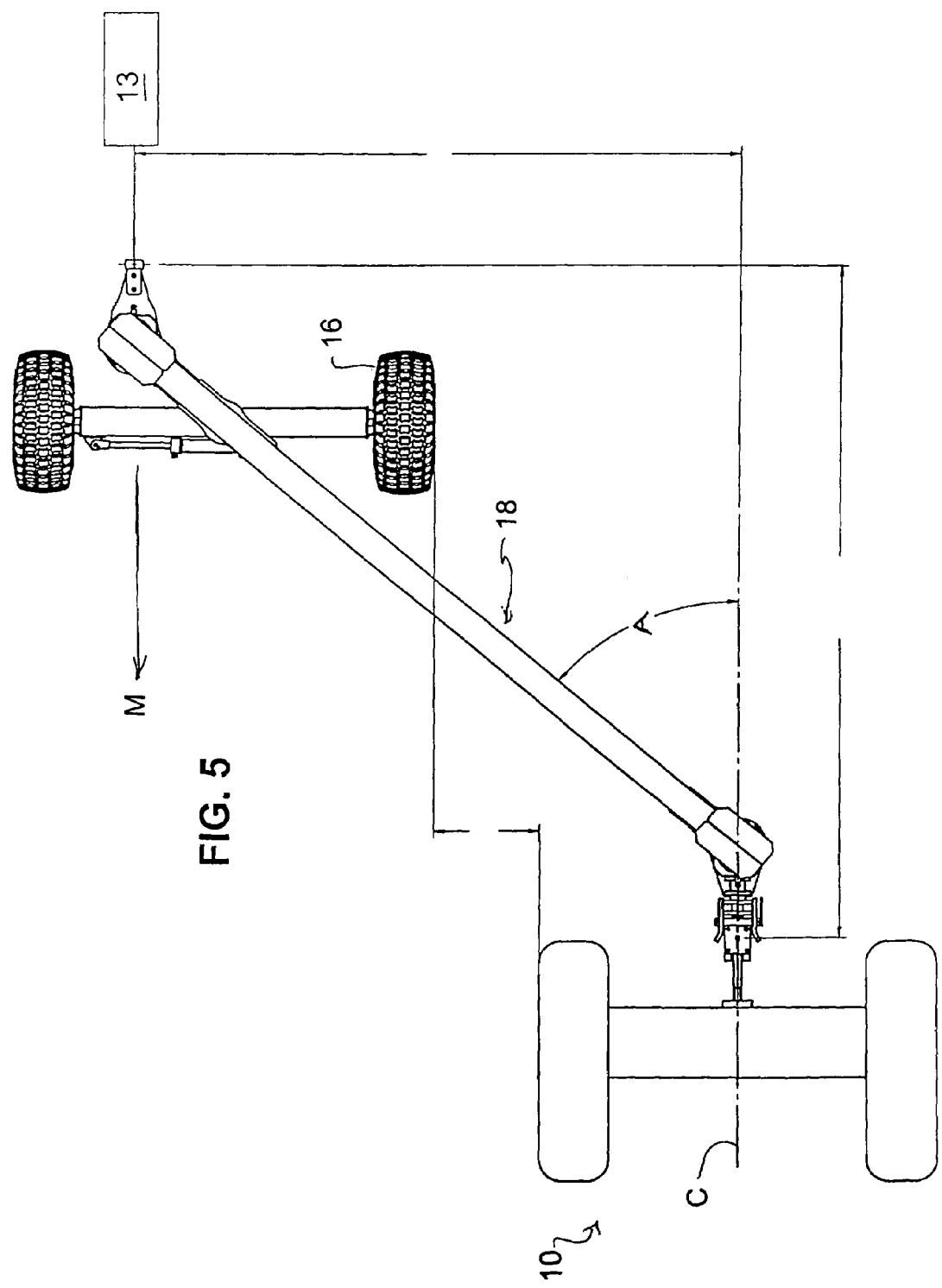
FIG. 5 is a top plan view of the apparatus of FIGS. 1-3 showing the attachment of the apparatus to the rear of the tractor in an offset configuration.

Because of the rigid 90 degree attachment of the front beam 21 and the rear beam 41 to the intermediate beam 31, the front swing axis FA and rear swing axis RA remain aligned substantially parallel to one another and perpendicular to the intermediate beam 31, no matter what direction or orientation the power transfer arm 18 achieves. This arrangement of the front and rear swing axes FA, RA permits the cutter 13 and respective rotary cutting elements to be pulled by the power transfer arm 18 along a travel vector M as seen in FIG. 5, parallel to but offset to either side from the centerline C of the tractor 10. As is more readily observed in FIG. 5, the power transfer arm 18 has a side to side, i.e. left and right, angular range A of about 50 degrees to either side of the center line C of the tractor 10. Although this angular range A could be larger or smaller than 50 degrees, for purposes of stability and mechanical articulation a range of about 50 degrees is preferable.

It is to be understood that the term side to side means that the travel vector M can be moved horizontally relative to the centerline C of the tractor 10 so that the travel vector M remains substantially parallel to the centerline C of the tractor 10 during operation, no matter what relative vertical discrepancy there is between the tractor 10 and the arm 18. It is also to be understood by the above description that the tractor 10 is pulling the cutter 13 in a substantially straight line, and that during turning operations the vector M may vary from such a parallel relation with the centerline C of the tractor 10.

Besides being capable of pulling the cutter 13 in an offset condition, i.e. the cutter 13 travel vector M, being spaced from the centerline C of the tractor 10 on either side of the tractor 10, it is to be appreciated that the power transfer arm 18 may also pull the cutter 13, either in a cutting mode or in a travel mode, directly behind the tractor 10 as shown in FIG. 4. This is of particular importance for safety and stability of the tractor 10. Travel and use of the tractor 10, either in a travel or cutting mode with the cutter 13 in an offset condition, i.e. with the cutter 13 spaced horizontally to one side or the other of the tractor 10, may counteract the center of gravity of the tractor 10 itself and create situations where the tractor 10 and cutter 13 are dangerously unbalanced. Thus, the ability to pull the cutter 13 into alignment, i.e. where the travel vector M of the cutter 13 is co-linear with the center line C of the tractor 10, is particularly important.

It is also to be appreciated by the above description that the front and rear beams 21 and 41 and the relative 90 degree connections with the intermediate beam 31 raise the intermediate beam 31 a desired distance above the ground. This spacing or clearance permits the power transfer arm 18 to pass over certain objects or obstacles to facilitate the mowing process. For example many roadways have curbs, or low railings which impede conventional tractors towing offset mowing devices. In the present invention when the cutter 13 is in an offset position relative to the tractor 10, the clearance provided by the raised intermediate arm would allow such impediments and obstacles to pass underneath the cutter arm, and between the cutter 13 and the tractor 10 without interfering with offset mowing operations.

Figure 6:
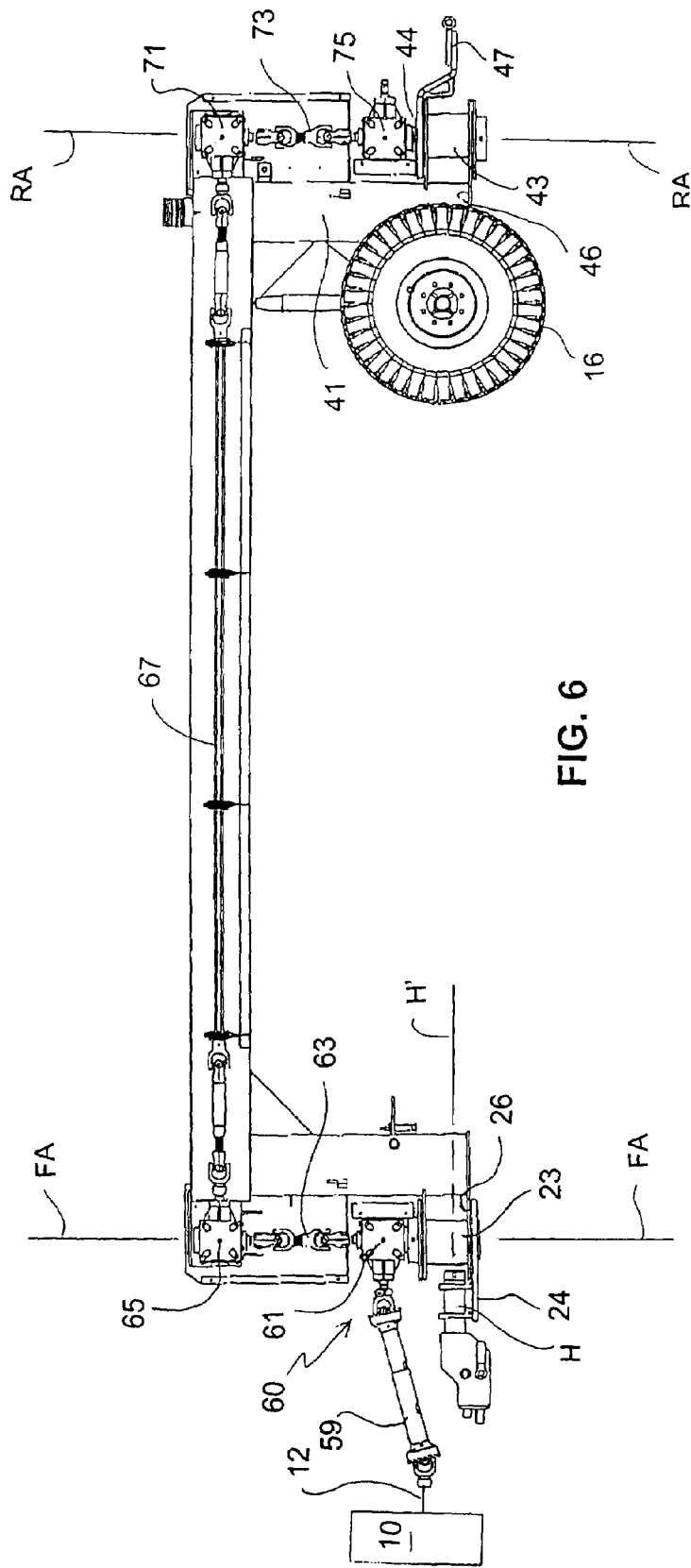
FIG. 6 is another side elevational view of the apparatus as shown in FIG. 1 showing the power transfer shafts.

Turning to FIG. 6, in order to operate the rotary cutting elements of the cutter 13, i.e. cutting blades, power from the tractor's engine must be transferred via a drive train 60, shown generally as 60, the power take-off shaft 12 from the tractor 10 as conventionally used to supply the necessary power to turn the rotary blades of the cutter 13. In the context of the articulated power transfer arm 18 as described herein, and the substantial angular range, i.e. articulation, of the power transfer arm 18 relative to the tractor 10, it is of paramount importance that cutter drive apparatus be as simple and sturdy as possible while permitting the desired movement of the power transfer arm 18. The above discussed structure of the power transfer arm 18 frame provides the support and essentially the pathway for the power train 60 to be described below, between the tractor 10 and the cutting elements of the cutter 13.

The power take off shaft 12 from the tractor 10 provides power through a drive connection shaft 59 to a first gear box 61 mounted on a base section 24 of the front swivel mount 23 on the power transfer arm 18. The base section 24 of the front swivel mount 23 is held horizontally fixed relative to the center line C of the tractor 10 so that the take-off shaft 12 and the drive connection shaft 59 with the first gear box 61 are always substantially in-line with the centerline C. The base section 24 is however radially rotatable about the axis H' as defined by the travel axis H, and the U-joints, or CV joints of the drive connection shaft 59 permit the relative radial rotation of the base section 24 and the supported gear box 61. As can be readily discerned by a person of skill in the art, this arrangement holds the first gear box 61 horizontally fixed, i.e. substantially in-line with the centerline of the tractor 10, but rotatable in a substantially radial plane perpendicular to the main travel vector T of the tractor 10.

The front beam 21 is fixedly attached to an arm support section 26 of the swivel mount 23 to rotate substantially horizontally about the front swing axis FA defined by the front swivel base 24 of the front swivel mount 23 and the first gear box 61 supported thereon. The front swivel mount 23 and the output shaft 69 from first gear box 61 essentially define the front swing axis FA about which the arm 18 swings horizontally side-to-side. Thus, in the case of side to side angular motion of the power transfer arm 18 relative to the tractor 10, due to the relative motion between the horizontally restrained front swivel base 24 and the front beam 21 which rotates horizontally about axis FA, the front beam 21, intermediate beam 31 and rear beam 41 of the arm 18 rotate about the front swing axis FA and consequently the output shaft 69 of the first gear box 61 even as the first gear box 61 maintains the in-line connection of the drive train 60 with the take-off shaft 12.

It is to be noted that the arm 18 and the drive train 60 are together radially rotatable along with the first gear box 61 about the plane perpendicular to the center line C of the tractor 10 due to the draw bar 11 and hitch connection as explained above. The result of which is that the power transfer arm 18 may be not only offset from the tractor 10 left or right, but also tipped to follow the contour or incline of a slope while the tractor 10 remains substantially level.

The first gear box 61 delivers power from the tractor 10 along a first shaft 63 to a second gear box 65. It is to be appreciated that first shaft 63 may be a straight power transmission shaft as known in the art, or the first shaft 63 may also comprise a series of U-joints as shown in FIG. 6, to absorb any minor misalignment or operating intolerances between the first and second gear boxes 61, 65. The second gear box 65 is supported adjacent the top portion of the front beam 21 and is provided spaced from and aligned with the first gear box 61 along the front swing axis FA.

The second gear box 65 delivers power from the first shaft 63 to an intermediate shaft 67. Because the first and second gear boxes 61, 65 are maintained in a linear relationship along the front swing axis FA, despite the relative radial rotation between the gear boxes, no matter at what angle the power transfer arm 18 is horizontally rotated about the front swing axis FA, and tipped radially about the axis H', the linear relationship between the second gear box 65 and the first gear box 61 about the front swing axis FA ensures that the first shaft 63 is maintained in-line with the intermediate shaft.

It is to be appreciated that a combined gear box may also be used in place of the above described first and second gear boxes and first shaft 63. The use of such a combined gear box could eliminate the necessity for the first shaft 63 and still ensure that a substantially in-line power transfer is accomplished between the tractor power take off and the intermediate power shaft 67 described above.

The second intermediate power shaft 67 extends from the second gear box 65 at about a ninety 90 degree angle relative to the first shaft 63, although other angles can be contemplated as well, along or within the intermediate beam 31 30 to a third gear box 71 supported in, on or adjacent the top portion 42 of the rear beam 41. The intermediate power shaft 67 is generally the longest of the power shafts as the length of this intermediate shaft determines the overall offset distance of the cutter 13 from the tractor 10.

The intermediate power shaft 67 is essentially parallel to and elevated above the ground in order to provide the above discussed ground clearance as well as a longer working length, i.e. offset distance, of the cutter arm. The third gear box 71 is aligned in-line with the second gear box 65 along an intermediate axis defined by the intermediate power shaft 67. It is to be appreciated that intermediate shaft 67 may be a straight power transmission shaft as known in the art, or the intermediate shaft may also comprise a series of U-joints as shown in FIG. 6, to absorb any minor misalignment or operating intolerances between the second and third gear boxes 65, 71.

Extending from the third gear box 71, again at about 90 degrees relative to the intermediate power shaft 67, is a third power shaft 73 which is connected with a fourth gear box 75 supported on a swivel base 44 of the rear swivel mount 43 adjacent a bottom portion 46 of the rear beam 41. The third power shaft 73 extends between the third and fourth gear boxes 71, 75 and substantially defines the rear swing axis RA. The fourth gear box 75 receives in-line power transfer from the from the third gear box 71 via the third shaft and into the fourth gear box 75 mounted on the rear swivel base 44 rear beam 41. The swivel base 44 of the rear swivel mount 43 also carries the rear cutter draw bar 47 which consequently, and in cooperation with the output shaft 78 from the fourth gear box 75, remains substantially in-line with the drive connection shaft 59 and the initial power delivery to the arm 18. The rear swivel mount 43 thus permits relative rotation between the power transfer arm 18 and the trailing cutter 13 about the rear swing axis RA where the rear swivel base 44 maintains the fourth gear box 75 and the power output shaft 78 substantially parallel, i.e. in-line with the power take off shaft 12. As can be readily discerned by a person of skill in the art, when the arm 18 is offset from the centerline C of the tractor 10, this arrangement permits the fourth gear box 75 to be correspondingly rotated about the rear swing axis RA relative to the rear beam 41 of the arm 18 while remaining in direct linear connection, i.e. in-line with the third gear box 71 which is maintained in a substantially fixed position relative to the arm 18.

Returning to FIG. 1, the power transfer arm 18 is supported by a wheel, or pair of ground following wheel(s) 16 attached to the arm 18 adjacent the rear beam 41. The wheel(s) 16 rotate about a generally horizontal wheel axle 15 which in turn is rotatable about a steering axis SA, to direct the offset of the rear end 40 of the arm 18 as desired. The steering axis SA is substantially parallel, but spaced forward, relative to the tractor 10, from the rear swing axis RA of the arm 18. The axle 15 and wheels 16 are in general hydraulically operated to turn about the steering axis SA and thus cause the offset of the power transfer arm 18 relative to the centerline C of the tractor 10, as the tractor 10 travels forward or backward.

The hydraulics, except for a single actual wheel steering piston 17 as shown, are omitted from the drawings as such is well known in the art and for purposes of clarity in the drawings. Because the wheel(s) are positioned essentially adjacent or connected to the rear beam 41, as the wheels steer the arm 18 away from the centerline C of the tractor 10, the rear beam 41 directly follows the wheel(s) away from the centerline C, thus causing the front beam 21 to rotate about the front swing axis FA and bring the power transfer arm 18 and cutter 13 into an offset position to one side or the other of the tractor 10. Throughout this off-setting motion, the cutter 13 remains is a substantially parallel direction of travel relative to that of the tractor 10 while the power transfer arm 18 creates an angular link between the cutter 13 and the tractor 10 to facilitate the parallel off-set travel.

One of the more important features of the arm 18 is that even during offset cutting operations the drive connection shaft 59, which is connected from the tractor 10 to the front end 20 of the arm 18, and the power output shaft 78, connected from the rear end 40 to the cutter 13, are almost always parallel with one another. This significantly reduces the wear and tear on the components of the arm 18 as well as components of the cutter 13. Furthermore, because the cutter 13 is always directly in-line with the output shaft 78, the life expectancy of the input drive of the cutter 13 is extended exponentially. It is well known that as the joint angle between parts of a power transmission driveline increase the average life expectancy of the joint decreases exponentially. Therefore with the parallel alignment of the power take off shaft 12, power output shaft 78 and the cutter 13, these in-line driveline components will last longer.

An important aspect of the present invention is the relative arrangement of the first, second, third and fourth gear boxes of the power transfer arm 18. The gear boxes are each a right angle gear box as shown in FIG. 6, and can be for example a splined shaft design as known in the art, although other designs of gear boxes could be contemplated. Within the context of the power transfer arm 18 the first gear box 61 receives power input from the tractor's 10 power take off shaft 12 and drive connection shaft 59. Because the first gear box 61 is fixed to the front swivel base 24 which does not rotate horizontally when the arm 18 is rotated about front swing axis FA to an offset position, the power take off shaft 12 and the input to the first gear box 61 remain in-line, i.e. there is little or no angular moment applied to the connection between the take off shaft 12 and the gear box 61.

The first gear box 61 transfers the input power 90 degrees via the first power shaft to the second gear box 65 which is also a 90 degree power transfer gear box. The second gear box 65 then supplies the power at about 90 degrees to the second power transmission shaft, and which in turn applies the power to the third gear box 71 which is again a 90 degree power transfer gear box. The third gear box 71 then provides 90 degree power transmission to the third power transmission shaft connected to the fourth gear box 75 which is also a 90 degree power transfer gear box for connection with the power output shaft 78 to drive the cutter 13. Because the fourth gear box 75 is fixed to the rear swivel base 44 which remains parallel to tractor center line C when the arm 18 is moved to an offset position, the power output shaft 78 remains in-line with the output of the fourth gear box 75 and with the cutter 13, i.e. there is little or no angular moment applied to the connection between the power output shaft 78 and the gear box 61, nor between the power output shaft 78 and the cutter 13. It is to be appreciated that the first and second gear boxes could be a combined gear box, which could eliminate the necessity for the first shaft 63. Also, the third and fourth gear boxes could also be a combined gear box eliminating the necessity for the third power shaft 73.

It is also to be noted that the above described power transfer arm 18 design permits a cutter to have, or accomplish a 0 degree turn radius. This is due to the fact that the cutter 13 turning radius is not limited by the turning radius of the tractor 10. By way of example, where an operator desires to mow around a sign post or utility pole, with the cutter 13 offset to the inside of the tractor 10 and the inner most side of the cutter 13 being immediately adjacent the sign post or utility pole, the tractor 10 can maintain a larger turning radius relative to the post or pole while permitting the cutter 13 to have a much smaller and independent turning radius dictated solely by the post or pole. This is true down to the zero turning radius where the cutter 13 can turn about a single point, i.e. a zero turning radius.

In summary, and by way of further explanation, the present invention relates to an articulated power transfer arm 18 for attaching an apparatus 13 to a towing vehicle 10 and towing the apparatus 13 along an apparatus travel axis generally parallel to a vehicle travel axis. The invention comprises an articulated arm assembly 18, including a U-arm assembly including a horizontal arm member 31 extending generally between the vehicle 10 and the apparatus 13, a forward vertical arm member 21 and a trailing vertical arm member 41. The arm includes a forward chassis having a forward horizontal pivot attachable to a vehicle drawbar 11 and allowing vertical rotation of the forward chassis about a forward horizontal axis h'. A forward vertical pivot 23 rotatably connecting the forward vertical arm member to the forward chassis and allowing rotation of the forward vertical arm member about a forward vertical axis FA. A trailing chassis including a trailing horizontal pivot P attachable to the apparatus and allowing vertical rotation of the apparatus about a trailing horizontal axis P', and a training vertical pivot 43 rotatably connecting the trailing vertical arm member 41 to the trailing chassis and allowing rotation of the trailing chassis about a trailing vertical axis RA. The invention also includes a power train assembly, having an input shaft 59 attachable to a power takeoff 12 of the vehicle 10 and connected by a first continuously variable rotating coupling to a forward vertical shaft 63 rotating coaxially with the forward vertical pivot. A horizontal arm shaft 67 rotating generally parallel with the horizontal arm member 31 and connected from the forward vertical shaft 63 and to a trailing vertical shaft 73 rotating coaxially with the trailing vertical pivot, and an output shaft 78 attachable to a power input of the apparatus and connected from the trailing vertical shaft by a continuously variable rotating coupling.

Since certain changes may be made in the above described improved off set power transfer arm 18 without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A control arm for pulling a power take-off driven implement comprising:
   a frame having a first pivotal connection at a first end and a second spaced apart pivotal connection at a second end;
   a support wheel pivotally supporting the second end of the frame;
   a power train for operating the power take-off driven implement comprising an input shaft at the first end of the frame and an output shaft at the second end of the frame defining an in-line driveline axis therebetween;
   an intermediate power shaft spaced from the driveline axis and connecting the input and the output shafts;
   a front gearbox providing a constant, substantially perpendicular transfer of power from the input shaft to the intermediate power shaft, and a rear gearbox providing a constant, second perpendicular transfer of power directly from the intermediate power shaft to the output shaft; and
   wherein the support wheel for the frame is positioned forward in the direction of travel of the power take-off driven implement and rotatably attached to a wheel support beam pivotally secured to the frame and independently pivotable about a central pivot point relative to both the frame and the towed power take-off driven implement during forward travel of the control arm.

2. The control arm for the power take-off driven implement as set forth in claim 1 wherein the intermediate power shaft is maintained parallel spaced from and radially rotatable about the in-line driveline axis defined between the input and output shafts.

3. The control arm for the power take-off driven implement as set forth in claim 1 wherein the steering wheel is spaced from the first end of the frame and attached to the frame forward of the cutting implement and forward of the second pivotal connection.

4. The control arm for the power take-off driven implement as set forth in claim 1 wherein the front gearbox further comprises a separate first and second gearboxes connected by a first drive shaft, and the rear gearbox further comprises a separate third and fourth gearboxes connected by a second drive shaft.

5. The control arm for the power take-off driven implement as set forth in claim 1 wherein the frame defines a plane which is substantially perpendicularly aligned relative to a ground surface being traversed by the control arm.

6. The control arm for the power take-off driven implement as set forth in claim 5 wherein at least a first and second gearboxes are linearly aligned on the frame.

7. The control arm the power take-off driven implement as set forth in claim 6 wherein a third and fourth linearly aligned gearboxes are supported on the frame.

8. A power transfer apparatus for connecting a prime mover and a power take-off driven work implement comprising:
   a first gear arrangement connected with a second gear arrangement;
   a front swing axis coaxially defined by a first linear power transfer shaft through the first gear arrangement;
   a rear swing axis defined by second linear power transfer shaft through the second gear arrangement
   where the rear swing axis is spaced from but parallel with the front swing axis and the rear swing axis is relatively rotatable about the front swing axis to permit relative horizontal displacement of the work implement relative to the prime mover;
   an intermediate power transfer shaft connecting the first and the second linear power transfer shafts wherein the intermediate power transfer shaft is maintained perpendicularly connected with both the first and the second linear power transfer shafts; and
   a pair of steering wheels supported on the power transfer apparatus forward of the work implement and rotatably attached to a single support beam pivotally secured to the power transfer apparatus and horizontally pivotable independent of both the power transfer apparatus and the towed work implement during forward travel of the power transfer apparatus.

9. The power transfer apparatus as set forth in claim 8 wherein a power input from the prime mover supplies power to the first gear arrangement which transfers the power along the first swing axis to the perpendicularly aligned intermediate power transfer shaft.

10. The power transfer apparatus as set forth in claim 9 wherein the perpendicularly aligned power transfer shaft transfers the power to the second gear arrangement and along the rear swing axis to provide a power output to the work implement aligned substantially parallel to the power input from the prime mover.

11. The power transfer apparatus as set forth in claim 10 further comprising a hitch apparatus which defines a first travel axis and a second travel axis wherein the first travel axis permits relative axial movement between the prime mover and the work implement, and the second travel axis permits relative radial rotation between the prime mover and the work implement.

12. A method of transferring power from a prime mover through an angularly adjustable connecting apparatus to a power take-off driven work implement, the method comprising the steps of:
   providing a first gear arrangement connected with a second gear arrangement;
   defining a front swing axis coaxially along a first linear power transfer shaft through the first gear arrangement;
   defining a rear swing axis along a second linear power transfer shaft through the second gear arrangement;
   spacing the rear swing axis from the front swing axis but in parallel therewith, and the rear swing axis is relatively rotatable about the front swing axis to permit relative horizontal displacement of the work implement relative to the prime mover;
   connecting an intermediate power transfer shaft to the first and the second linear power transfer shafts wherein the intermediate power transfer shaft is maintained perpendicularly connected with both the first and the second linear power transfer shafts; and
   supporting the power transfer apparatus on at least a wheel located forward of the power take-off driven work implement in a forward direction of travel and rotatably attaching the wheel to a wheel support beam having a central pivot point pivotally secured to the frame and horizontally pivotable independent of both the angularly adjustable connecting apparatus and the work implement during forward travel of the angularly adjustable connecting apparatus.

13. The method of transferring power from the prime mover through the angularly adjustable connecting apparatus to the power take-off driven work implement as set forth in claim 12, further comprising the steps of supplying an input power to the first gear arrangement and obtaining an output power from the second gear arrangement which is parallel to the input power.

14. The method of transferring power from the prime mover through the angularly adjustable connecting apparatus to the power take-off driven work implement as set forth in claim 13, further comprising the step of maintaining the parallel alignment of the input and output power while the rear swing axis in rotated about the front swing axis.

15. The method of transferring power from the prime mover through the angularly adjustable connecting apparatus to the power take-off driven work implement as set forth in claim 14, further comprising the step of connecting the first and second gear arrangements by a power transfer shaft aligned substantially perpendicular to the front and rear swing axes.

16. The method of transferring power from the prime mover through the angularly adjustable connecting apparatus to the power take-off driven work implement as set forth in claim 15, further comprising the steps of providing a connection between the angularly adjustable connecting apparatus and the prime mover which permits relative axial and radial movement between the prime mover and the connecting apparatus.

17. The method of transferring power from the prime mover through the angularly adjustable connecting apparatus to the power take-off driven work implement as set forth in claim 12, further comprising the steps of supporting the connecting apparatus on a ground surface via at least a steerable ground wheel attached to the connecting apparatus.

18. An articulated power transfer arm comprising:
   a tongue supporting a power take-off driven transmission arrangement for a towed device, the transmission arrangement comprising:
      a first gear assembly having a power input connected to a front linear power transfer apparatus at a substantially 90 degree angle, and the front linear power transfer apparatus connected to a linear power transfer shaft;
      a second gear assembly having a rear linear power transfer apparatus correspondingly connected to the linear power transfer shaft, and the rear linear power transfer apparatus being connected at a substantially 90 degree angle to a power output of the articulated power transfer arm;
   the tongue maintains the front linear power transfer, the linear power transfer shaft, and the rear linear power transfer in a planar and perpendicular relation with one another to achieve a constant parallel alignment of the power input and the power output and the tongue further aligns the front linear power transfer apparatus coaxial with a substantially vertical front pivot axis of the power transfer arm and the rear linear power transfer apparatus aligned coaxial with a substantially vertical rear pivot axis; and wherein a steerable wheel is attached to the tongue at a vertical pivot point located axially forward of a cutting implement connected to the rear linear power transfer apparatus in a forward direction of travel of the power transfer arm and the steerable wheel is rotatably attached to a wheel support beam defining the vertical pivot point at a central point of the support beam secured to the tongue and the support beam being horizontally pivotable independent of both the tongue and the towed work implement during forward travel of the tongue.

19. The articulated power transfer arm of claim 18, wherein a front beam extends substantially perpendicularly downwards from a forward end of an intermediate beam and supports the first gear assembly.

20. The articulated power transfer arm of claim 19, wherein a rear beam extends substantially perpendicularly downwards from a rear end of the intermediate beam and supports the second gear assembly.

21. The articulated power transfer arm of claim 20, wherein the intermediate beam extends substantially perpendicularly between the front beam and rear beam and supports the linear power transfer shaft.

22. The articulated power transfer arm of claim 18, wherein the front linear power transfer apparatus is connected to the linear power transfer shaft at a substantially 90 degree angle, and the rear linear power transfer apparatus is correspondingly connected to the linear power transfer shaft at a substantially 90 degree angle.

23. A combined power transfer arm and coupling device for connecting a towed implement with a tractor, the power transfer arm comprising:

a carrier frame comprising;

a rigid front support connected perpendicularly to an intermediate support which is in turn connected perpendicularly to a rear support, the carrier frame supporting a power transmission means comprising;

a first gear box and a second gear box supported on the frame adjacent the front support, and a third gear box and a fourth gear box supported on the flame adjacent the rear support;

a first transmission shaft connecting the first and second gear box, a second transmission shaft connecting the second and third gear box and a third transmission shaft connecting the third and fourth gear box;

a front vertical swing axis about which the carrier frame rotates relative to the tractor is defined by the first transmission shaft and a rear vertical swing axis about which the towed implement rotates relative to the carrier frame is defined by the third transmission shaft; and wherein the carrier frame further comprises a steerable wheel and a support beam attached to the carrier frame by a vertical pivot point spaced forward of the towed implement and centrally located on the support beam which is independently pivotable relative to both the power transfer apparatus and the towed work implement during forward travel of the power transfer apparatus.

* * * * *